United States Patent Office

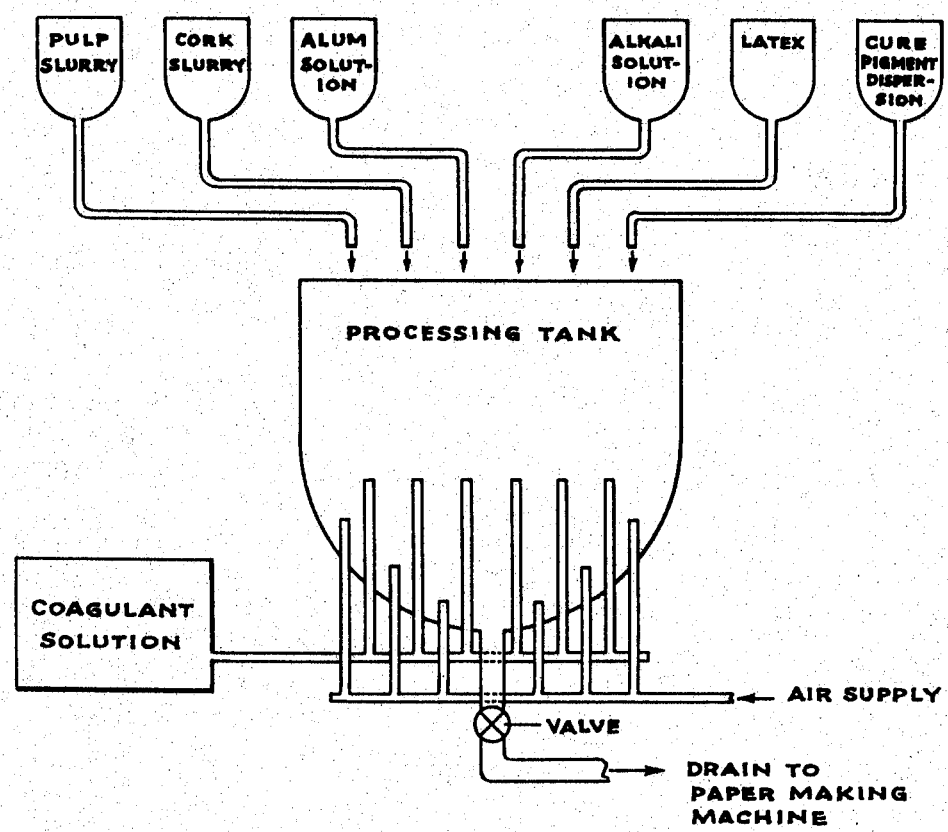

3,082,145
Patented Mar. 19, 1963

3,082,145
PROCESS FOR PREPARING CORK AND
FIBER COMPOSITIONS
John Y. L. Kao, Lombard, Ill., assignor to F. D. Farnam
Co., a corporation of Illinois
Filed Mar. 24, 1960, Ser. No. 17,360
7 Claims. (Cl. 162—158)

The present application is a continuation-in-part of my prior application, Serial No. 640,034, filed February 13, 1957, entitled "Process for Preparing Cork and Fiber Compositions," now abandoned, and said prior application was a continuation-in-part of my earlier application, Serial No. 432,900, filed April 16, 1954 (now Patent No. 2,884,060), entitled "Method for Preparing a Novel Cork Composition and Products Produced Thereby."

In these prior applications, I have described a process for coating cork granules of a particle size ranging from 25 mesh to 200 mesh, or less, preferably passing through 40 mesh, with coating materials such as natural and synthetic rubbers, thermoplastic and thermosetting rubbers, thermoplastic and thermosetting resins and plastics, plasticizers, waxes, oils, and the like, all in the form of emulsions. The present invention is closely related to these previously disclosed processes, and, for that reason, the entire disclosures of said prior applications, Serial No. 640,034 and Serial No. 432,900, are specifically incorporated herein by reference in so far as these disclosures are not inconsistent with the present disclosure.

This invention relates to a process for preparing a cork and fiber composition and the products produced thereby, wherein the cork and fiber is coated with a coating material of the type described above.

Natural cork contains millions of minute cells within each cubic inch of cork and each of the cells has a tetrakaidecahedronal shape. The cells are formed by a strong membrane material and the 14-sided cells are arranged in a way that there are no empty spaces or interstices between the cells.

Each of the tetrakaidecahedronal cells contains a minute amount of air therein so that approximately fifty percent of the total volume of cork is air. The air within the cells serves a multitude of purposes, one of which is that the multitude of air spaces makes cork a good insulating material. The resiliency of cork is well-known and the resiliency comes principally from the air entrapped within the cells. When a load is applied to a cork body, the air is compressed and the cork deflects, but when the load is removed, the body resumes its approximate normal shape due to the re-expansion of the air.

The air within the cells also serves to reduce the specific gravity of the cork to approximately 0.25, thus cork is known as a light-weight material.

These desirable properties of cork are useful in many respects. However, cork has other properties which are undesirable, one of these properties being its low tensile strength which makes its use under conditions of tensile stress somewhat limited. Another shortcoming is that since cork is a natural product, it often has impurities and lacks homogeneity.

For many years, the unique properties of cork have resulted in its extensive use as a gasket material, although much difficulty has been encountered due to impurities, inclusions, lack of homogeneity, etc.

In order to take advantage of the desirable properties of cork and eliminate some of the undesirable ones, cork is sometimes ground into granules, then combined with a fibrous material, and finally formed into a sheet by using a binding material to hold the fibers and cork together in the sheet.

As the cork is ground into small granules, it is observed that as the granules become smaller, the ratio of entrapped air within the granule to the mass of the granule also becomes smaller. When the cork granules are reduced to a size known as dust, the individual granules are so small that the cells within the cork particles are substantially completely broken down so that there is virtually no air entrapped within the cork particles. The lack of entrapped air within the cork particle makes the cork dust lose a greater portion of its resilience and insulating properties which are commonly associated with cork.

Much difficulty has been encountered in prior art processes in satisfactorily coating fibers and cork particles in a slurry system due to the differences in the physical properties of the fibers and cork. Upon blending of fibrous materials, such as vegetable pulp, with cork granules in the same slurry system, attention must be given to a number of factors which affect the ability of the cork and fiber particles to be satisfactorily and adequately coated. For example, cork is granular in form while pulp fiber has a relatively long, thin, cylindrical shape. This dissimilarity in physical structure produces a problem. Vegetable pulp fiber is slightly heavier than water while cork is about one-fourth the density, and this difference in density also poses a problem. A still further complication is that vegetable pulp fiber absorbs water readily, disperses and stays in water, while cork is highly resistant to water absorption and floats on the surface of water.

Due to the good water absorption and density of the vegetable fibers, the vegetable pulp is readily wetted and sinks in the water once it is dispersed. Cork granules, on the contrary, have poor water absorption and a density less than water, and hence cork granules are not easily wetted and tend to float on the surface of the water during the dispersion process.

When an attempt is made to coat fibers and cork granules in the same slurry system, the viscosity of the slurry is substantially the same as a pulp slurry, and substantially greater than that of a cork slurry, with the result that the pulp fibers in the composite slurry substantially reduce the freedom of movement of the cork granules. The increase in the viscosity of the system as compared to a slurry of cork alone undoubtedly reduces or restrains the movement of the cork granules unless more violent agitation is applied. The presence of innumerable fibers in the same system, however, creates extra resistance to the free movement of the cork granules, and this also increases the amount of agitation required. Even with the type of violent agitation necessary to provide the required dispersion of the fibers and cork granules in the slurry to achieve effective coating, this same violent agitation tends to disrupt the forces which hold the coating on the fibers and cork granules, and hence the very agitation which is needed to effect the required dispersion (normally a beater operation, or other mechanical agitation of the propeller type, turbine type, etc.) also detracts from the end result by separating the coating from the individual fibers and cork granules.

By subjecting the slurry composed of a blend of cork granules and pulp fibers to agitation for coating with materials such as natural or synthetic rubbers, thermoplastic and thermosetting resins and plastics, plasticizers, waxes and oils, and the like, in the form of emulsions, it is readily seen that the larger sized cork particles would not be coated completely and uniformly, due to the ineffective agitation in bringing those particles into water against their own buoyancy. Sheets formed from such a slurry lack uniformity of distribution of the coating materials, uniform distribution of the cork granules, uniform thickness, and evenness of surface.

The factors set forth above reasonably explain the difficulties encountered in using conventional beater type or other violent form of mechanical agitation for attempting to impart an even coating to the constituents of a pulp and cork slurry. These difficulties are far more pronounced because the high viscosity of such stock further reduces the already ineffective agitation of the beater operation, or other commonly used types of agitation mentioned heretofore.

In speaking of fibrous materials, it should be understood that they may be a wood pulp, asbestos, cotton, wool, leather, jute, manila, hemp, or the like, or some combination of these materials.

It has been proposed, as, for example, in Feigley Patent No. 2,613,190, to overcome some of these difficulties by using cork granules of relatively minute size, namely, from 200 mesh to dust. While it is true that using cork particles of this fineness tends to lessen the problem of getting the cork particles into effective dispersion within the slurry, it is apparent that the resultant sheets produced from the slurry and the ultimate products fabricated therefrom will lack some of the desirable physical properties which might be expected when cork is used in the composition. The fact is that the cork granules are so small in size that they will have lost to a large extent some of the properties that are attributed to cork, such as low thermoconductivity, high compressibility, high resilience and good insulation properties. In other words, by using cork granules of a size ranging from 200 mesh to dust, it may be possible to achieve an effective coating of the fibers and cork granules in a dispersion, but the resultant product will lack in the physical properties that would be expected when cork granules and fibers are combined in a slurry system for coating.

It is generally believed, as is stated by Feigley in his Patent No. 2,613,190, that when cork granules larger than 200 mesh are used, it is impossible to get effective coating, but I have found that this is not so and have been able to produce sheets from a fiber and cork granule slurry which have what I beleive to be substantially different and superior physical properties to those produced in the Feigley process. In doing this, I have been able to employ cork granules of a size greater than Feigley said was possible, some of these granules being as much as approximately thirty times larger than the largest particle size employed in the Feigley process. In fact, I may employ any combination of particle sizes ranging from those which just pass through a 60 mesh screen down to dust, as will be shown more specifically in the examples given hereafter.

The principal object, therefore, of the present invention is to provide a process for coating fibers and cork granules of a size from 60 mesh to dust (including various grades within that range, as, for example, granules passing 60 mesh and retained on 80 mesh; granules passing 100 mesh and retained on 150 mesh; granules passing 100 mesh and retained on 300 mesh, etc.) with emulsified material such as rubber latices, natural and synthetic resins, thermoplastic and thermosetting resins and plastics, plasticizers, waxes, oils, and the like simultaneously in a container to produce an even coating on the cork granules and fibers.

Another object of the instant invention is to provide a process for making a slurry of cork and fiber material with a uniform distribution of said materials for use in a paper or board making machine.

Another object of the invention is to provide a slurry which has a uniform distribution of cork granules and fibers, and with the fibers and granules having a uniform coating of an emulsified material such as rubber latices, thermoplastic and thermosetting resins and plastics, plasticizers, waxes, oils, or the like.

A further object of the instant invention is to provide a process for uniformly coating cork granules and fibers with an emulsified material such as rubber latices, thermoplastic and thermosetting resins and plastics, plasticizers, waxes, oils, or the like while said cork granules and fibers are in a slurry and uniformly distributed therein.

The above indicated objects are but an illustration of a few of the objects which the instant invention seeks to achieve. Other objects will become apparent to those skilled in the art as they read the appended specification in conjunction with the drawing.

FIGURE 1 is a diagrammatic representation of the flow of materials to a container wherein cork and fibers are uniformly mixed and coated.

In my present invention, bleached sulphate is used for preparing an aqueous pulp slurry although other vegetable fibers such as unbleached sulphate and sulphite, animal fibers such as leather and wool, and mineral fibers such as asbestos are equally applicable. The method of making the fiber pulp slurry may be any one of the well-known methods for making such slurries, and the type of fiber used is a matter of choice. However, in the specific disclosure which follows, vegetable fibers are contemplated.

An aqueous cork granule slurry is made from cork granules ranging in size from 60 mesh to dust. In some instances, the granule size may be from 60 mesh to dust, from 80 mesh to dust, from 100 mesh to dust, etc., depending upon the ultimate physical properties desired in the finished sheet. In some instances the granule size may be 60 to 80 mesh (i.e., passing through a 60 mesh screen but retained on an 80 mesh screen) or 80 to 100 mesh or 160 to 200 mesh or 160 to 240 mesh, or any combination of particular sizes which includes granules larger than 200 mesh. The cork slurry is prepared by dispersing cork granules having the size mentioned above in water to a concentration of approximately five percent by means of mechanical agitation preferably with the aid of a small amount of a suitable wetting agent.

As is diagrammatically represented in FIGURE 1, the pulp slurry is pumped into a processing tank and the cork slurry is also pumped into the same processing tank with sufficient water to make a slurry with less than two percent solids by weight and preferably less than one percent to make a blend slurry.

This low concentration is preferred because at this concentration there is little or no tendency to form clots or clumps of fibers as is the case with higher concentrations. Furthermore, with this low concentration, the viscosity of the blend slurry approaches that of water which makes its agitation easier, thus increasing the dispersion of the fibers and cork granules to present maximum surface of the materials to be coated.

The blend slurry is transferred to an agitation tank which preferably is a cylindrical vessel wherein the side walls curve into the bottom, which may be concave, so as to remove any sharp corners or crevices which could create dead spots or local eddy currents which would upset or disturb the regular and even—though very turbulent—agitation of the blend slurry. Agitation is preferably not carried out by any mechanical device but rather by means of air or a gas which is substantially water insoluble and non-reactive with water, pulp, cork, or added substances and which is introduced through strategically located jets or outlets in the bottom of the tank. The location of the jets or outlets forms no part of the present invention, but it is essential that they be located so that the entire mass of the blend slurry will be continuously agitated, and so that the fibers and cork will be given a turbulent movement and completely dispersed to inhibit the formation of clumps of fibers and/or cork. Both the mass and turbulent movements are very rapid so as to facilitate the dispersion of the fibers, cork, and the emulsified coating material. As the air bubbles rise to the surface of the liquid in the tank, it expands also to aid in the dispersion of the pulp fibers and the cork.

The gas which is used is preferably air, nitrogen, or a similar gas which is substantially insoluble in water and has no chemical effect upon the pulp, cork, or the emulsified coating material. However, there may be occasions when a gas may be chosen for its chemical activity—such as chlorine—so as to obtain a particular result. It is preferred that air be used because it may be compressed and filtered in the mill without the necessity of allocating storage space for tanks as would be the case were nitrogen to be used. It is essential that the gas be free from dust, dirt and other impurities. The gas is admitted to the tank at such a rate as to obtain a complete and substantially instantaneous dispersion of the emulsified coating material which is added to the agitated slurry at a controlled rate.

Although gas agitation is preferred for the reasons mentioned above, it is possible to employ gentle, though turbulent, forms of mechanical agitation. The most important aim in mechanical agitation of the coating system is to agitate in such a way that the coating material does not become dislodged from the fibers and cork through mechanical abrasion or otherwise, and in such a way that there is efficient mass transfer (rapid distribution) of the coagulant throughout the dispersion. This generally means that in the case of mechanical agitation a relatively large propeller should be used for operating at slow speeds and located at the bottom of a vessel which is preferably fitted with baffle plates spaced around the inner wall of the mixing vessel. The baffles may be at an angle to the axis of the vessel and are used to divert the material at the bottom upwardly and to oppose the flow as generated by the propeller. The stirring rate must be low but adequate to maintain a truly mass movement of the slurry within the vessel.

After the blend slurry has been formed in the processing tank, it is agitated as described and the agitation is continued until the end of the process.

After the blend slurry has been formed in the tank and the agitation begun, with the granules being thoroughly wetted with water by the aid, if necessary, of a wetting agent as hereinbefore described, it is then desirable to introduce water-soluble salts of polyvalent cations, such, for example, as the water-soluble salts of calcium, aluminum or thorium to bring the pH of the slurry to about 4 at 70° F. An alkali, such as sodium carbonate or sodium hydroxide, is then added to adjust the pH to approximately 5, in order to condition the granules and the fibers for the reception of the coating material. After agitation has continued for a sufficient time to permit proper conditioning of the blend (say fifteen to forty-five minutes under normal circumstances), the coating material in emulsion form is added to the agitating slurry at such a rate that it will rapidly disperse into the blend slurry. To accomplish this most effectively, the emulsified coating material should be fed directly into the center or centers of agitation, either in drops or in small streams.

It should be particularly noted that when the coating emulsion, such as latex, is added, the slurry is in such a state of dilution, agitation, and preconditioning, that the latex has every opportunity to find and adhere to the individual fibers and cork particles for effective coating.

The coating emulsion, whatever it may be, may or may not require the use of stabilizers such as ionizable or non-ionizable soaps or protective colloids, such as casein, glue, or haemoglobin. The emulsion is diluted to a concentration of between 1% to 10% by weight of solids, although higher or lower concentrations in some cases appear to be satisfactory.

After all the coating emulsion has been added into the blend dispersion system, dilute coagulant in the form of an aqueous solution of water-soluble salts of polyvalent metals, as for example alum, is then added to exhaust the coating material from the dispersing medium, so that the latter becomes water clear. Preferably, the coagulant for this step should be of low concentration, preferably less than one percent. Because of the presence of resin or rubber particles in the dispersion, the addition of coagulant must be done carefully to prevent local coagulation, and it is added slowly while the blend slurry is kept in dispersion by means of suitable agitation. After the addition of the dilute coagulant, the blend dispersion should be free from any of the coating emulsion, and this can be visually evaluated by the clarity of the dispersion medium.

During coagulation, the coating material attaches itself to the discrete fiber and cork granule particles. It is observed that the coated fibers and cork particles are individually separated from each other and that the slurry has a uniform distribution of the cork granules and fibers. Furthermore, there is a substantially uniform coating of material on the fibers and on each cork granule as compared to the lumpy uneven coating which results from use of conventional mechanical agitation.

It should be noted that the fibers and cork granules receive the coating material uniformly, not only because of the gentle agitation, but also because of the conditioning of the fibers and cork granules to make their attraction to and acceptance of the coating materials almost equal. Equalization is achieved, as hereinbefore stated, by adding water-soluble salts of polyvalent metals, for example, alum, to the blend slurry to bring the pH to about 4 at 70° F. and then adding alkali, such as sodium carbonate, to bring the pH of the blend slurry to about 5. Whether the adsorbate is the alum ion or positively charged aluminum hydroxide particles, the net result is that the cork granules and the fibers are both completely and uniformly coated with the coating material with substantially 100 percent retention.

After the coagulant has exhausted the emulsified coating material from the dispersion medium in the blended slurry, and the process completed, the slurry is introduced to a paper making machine or board making equipment where the slurry is made into sheet material in a conventional manner.

Microscopic examination of the slurry constituents after use of my process reveals that substantially all of the very fine cork particles are deposited on the fibers along with the coating material and become permanently attached to the fiber. The large cork granules are substantially covered with the coating material which seems to change their specific gravity to substantially that of water, with the result that the cork particles in the blended slurry are no longer buoyed to the surface of the water and hence can be and are uniformly distributed throughout the slurry. Not only are the coated cork particles uniformly distributed in the slurry, but it is also true when the slurry is transferred to the head box, vats, or the like, of the paper or paper-board making machine. An examination of the cork granules in a sheet of material which has been processed according to this invention and then made into sheet in a paper making machine or paper-board making machine indicates that the cork granules are substantially uniformly dispersed throughout the entire body of the sheet.

Some of the variations of materials used in my process are best exemplified in the following examples:

Example 1

Total Medium Acrylonitrile binder_____percent__ 25
Parts fiber:parts cork_____ 1:1

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium acrylonitrile latex (stabilized) | 27.3 | 13.3 | 48.6 |
| Cure Mix | 50.0 | 1.27 | 2.54 |
| Coagulant | 0.5 | 3.5 | 700.00 |

[1] To approximately pH equal to 4.
[2] To approximately pH equal to 5.

Tergitol #4 is a conventional wetting agent and is a sodium sulfate derivative of 7-ethyl-2-methyl undecanol-4 manufactured by Carbide & Carbon Chemicals Co. The Cure Mix is a mixture of aqueous dispersions of an antioxidant, an activator such as zinc oxide, sulphur and an accelerator. The Cure Mix is manufactured by R. T. Vanderbilt Co., 230 Park Avenue, New York. The Medium Acrylonitrile Latex is manufactured by Goodyear Chemical Division of Goodyear Tire and Rubber Co.

The Cure Mix in this and the succeeding examples is added to the slurry after the latex and prior to the second addition of coagulant. The same is true of any fillers, pigments, or the like, in the form of aqueous dispersions.

Also in this and succeeding examples it should be understood that the latex emulsion is normally diluted to about 5% by weight for ease of control.

Example 2

Total Medium Acrylonitrile binder_____percent__ 40
Parts fiber:parts cork_____ 1:1

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium acrylonitrile latex (stabilized) | 27.3 | 26.70 | 97.6 |
| Cure Mix | 50.0 | 2.50 | 5.0 |
| Coagulant | 0.5 | 5.00 | 1,000.0 |

See Example 1 for footnotes.

Example 3

Total Medium Acrylonitrile binder_____percent__ 65
Parts fiber:parts cork_____ 1:1

| Material | Percent | Dry weight | Wet weight |
|---|---|---|---|
| Vegetable pulp | 1.0 | 20.0 | 2,000.0 |
| Water | | | 8,000.0 |
| Cork, 80 mesh to dust | | 20.0 | 20.0 |
| Tergitol #4 | 0.25 | 0.0025 | 1.0 |
| Alum | [1] 1.0 | [1] 5.3 | [1] 530.00 |
| Sodium hydroxide | [2] 2.5 | [2] 1.0 | [2] 40.0 |
| Medium acrylonitrile latex (stabilized) | 27.3 | 74.0 | 271.0 |
| Cure Mix | 50.0 | 7.0 | 14.0 |
| Coagulant | 0.5 | 10.0 | 2,000.0 |

See Example 1 for footnotes.

Example 4

Total GR-S binder_____percent__ 50
Parts fiber:parts cork_____ 1:1

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 20.0 | 20.0 |
| Tergitol #4 | 0.25 | 0.0025 | 1.0 |
| Alum | [1] 1.0 | [1] 3.50 | [1] 350.0 |
| Sodium hydroxide | [2] 2.5 | [2] 0.725 | [2] 29.0 |
| GR-S Type IV Latex (stabilized) | 23.9 | 40.0 | 167.0 |
| Cure Mix | 50.0 | 3.8 | 7.6 |
| Coagulant | 0.5 | 7.0 | 1,400.0 |

See Example 1 for footnotes.
NOTE.—The GR-S Type IV Latex is manufactured by Naugatuck Chemical Co., New York, New York.

Example 5

Total Medium Acrylonitrile and Plasticizer binder_____percent__ 40
Parts fiber:parts cork_____ 1:1

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 22.70 | 83.0 |
| Plasticizer Hycar 1502 Latex (stabilized) | 24.9 | 4.00 | 16.1 |
| Cure Mix | 50.0 | 2.50 | 5.0 |
| Coagulant | 0.5 | 5.0 | 1,000.0 |

See Example 1 for footnotes.
NOTE.—Hycar 1502 Latex is a latex manufactured by B. F. Goodrich Chemical Co., Cleveland, Ohio.

Example 6

Total High Acrylonitrile binder_____percent__ 35
Parts fiber:parts cork_____ 1:1

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| High Acrylonitrile Latex (stabilized) | 28.9 | 21.5 | 74.5 |
| Cure Mix | 50.0 | 2.0 | 4.0 |
| Coagulant | 0.5 | 4.5 | 900.0 |

See Example 1 for footnotes.
NOTE.—The High Acrylonitrile Latex is manufactured by Goodyear Chemical Division of Goodyear Tire & Rubber Co.

Example 7

Total High Acrylonitrile and Phenolic Resin binder_____percent__ 40
Parts fiber:parts cork_____ 1:1

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 20.0 | 20.0 |
| Tergitol #4 | 0.25 | 0.0025 | 1.0 |
| Alum | [1] 0.0 | [1] 3.5 | [1] 350.0 |
| Sodium hydroxide | [2] 2.5 | [2] 0.725 | [2] 29.0 |
| High Acrylonitrile Latex (stabilized) | 28.9 | 21.30 | 73.6 |
| Durez Phenolic 12086 emulsion | 30.0 | 5.35 | 17.8 |
| Cure Mix | 50.0 | 2.00 | 4.0 |
| Coagulant | 0.5 | 6.5 | 1,300.0 |

See Example 1 for footnotes.
NOTE.—The Phenolic 12086 is a resin manufactured by Durez Plastics Division of Hooker Electrochemical Co., North Tonawanda, New York.

Example 8

Total GR-S binder_____percent__ 35
Parts fiber: parts cork_____1:0.625

| Material | Percent | Dry weight | Wet weight |
|---|---|---|---|
| Vegetable pulp | 1.0 | 20.0 | 2,000.0 |
| Water | | | 4,600.0 |
| Cork, 80 mesh to dust | | 12.5 | 12.5 |
| Tergitol #4 | 0.25 | 0.00125 | 0.5 |
| Alum | [1] 1.0 | [1] 3.5 | [1] 350.0 |
| Sodium hydroxide | [2] 2.5 | [2] 0.725 | [2] 29.0 |
| GR-S Type #4 IV Latex (stabilized) | 23.9 | 17.5 | 73.3 |
| Cure Mix | 50.0 | 1.65 | 3.3 |
| Coagulant | 0.5 | 3.5 | 700.0 |

See Example 1 for footnotes.

Example 9

Total Medium Acrylonitrile binder_____percent__ 40
Parts fiber:parts cork_____1:1

| Material | Percent | Dry weight | Wet weight |
|---|---|---|---|
| Vegetable pulp | 1.0 | 20.0 | 2,000.0 |
| Water | | | 4,600.0 |
| Cork, 60 mesh to dust | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 26.70 | 97.6 |
| Cure Mix | 50.0 | 2.50 | 5.0 |
| Coagulant | 0.5 | 6.0 | 1,200.0 |

See Example 1 for footnotes.

Example 10

Total Medium Acrylonitrile binder_____percent__ 40
Parts fiber:parts cork_____1:1

| Material | Percent | Dry weight | Wet weight |
|---|---|---|---|
| Vegetable pulp | 1.0 | 20.0 | 2,000.0 |
| Water | | | 4,600.0 |
| Cork, 100 mesh to dust | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 26.70 | 97.6 |
| Cure Mix | 50.0 | 2.50 | 5.0 |
| Coagulant | 0.5 | 6.00 | 1,200.0 |

See Example 1 for footnotes.

Example 11

Total Medium Acrylonitrile binder_____percent__ 40
Parts fiber:parts cork_____1:1

| Material | Percent | Dry weight | Wet weight |
|---|---|---|---|
| Vegetable pulp | 1.0 | 20.0 | 2,000.0 |
| Water | | | 4,600.0 |
| Cork, 60-80 mesh | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 26.70 | 97.6 |
| Cure Mix | 50.0 | 2.5 | 5.0 |
| Coagulant | 0.5 | 6.0 | 1,200.0 |

See Example 1 for footnotes.

Example 12

Total Medium Acrylonitrile binder_____percent__ 40
Parts fiber:parts cork_____1:1

| Material | Percent | Dry weight | Wet weight |
|---|---|---|---|
| Vegetable pulp | 1.0 | 20.0 | 2,000.0 |
| Water | | | 4,600.0 |
| Cork, 80-100 mesh | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 26.70 | 97.6 |
| Cure Mix | 50.0 | 2.50 | 5.0 |
| Coagulant | 0.5 | 6.0 | 1,200.0 |

See Example 1 for footnotes.

Example 13

Total Medium Acrylonitrile binder_____percent__ 40
Parts fiber:parts cork_____1:1

| Material | Percent | Dry weight | Wet weight |
|---|---|---|---|
| Vegetable pulp | 1.0 | 20.0 | 2,000.0 |
| Water | | | 4,600.0 |
| Cork, 100-120 mesh | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 26.70 | 97.6 |
| Cure Mix | 50.0 | 2.50 | 5.0 |
| Coagulant | 0.5 | 6.00 | 1,200.0 |

See Example 1 for footnotes.

Example 14

Total Medium Acrylonitrile binder_____percent__ 40
Parts fiber:parts cork_____1:1

| Material | Percent | Dry weight | Wet weight |
|---|---|---|---|
| Vegetable pulp | 1.0 | 20.0 | 2,000.0 |
| Water | | | 4,600.0 |
| Cork, 170-200 mesh | | 20.0 | 20.0 |
| Tergitol #4 | 0.25 | 0.0025 | 1.0 |
| Alum | [1] 1.0 | [1] 3.5 | [1] 350.0 |
| Sodium hydroxide | [2] 2.5 | [2] 0.725 | [2] 29.0 |
| Medium Acrylonitrile Latex (stabilized) | 27.3 | 26.7 | 97.6 |
| Cure Mix | 50.0 | 2.5 | 5.0 |
| Coagulant | 0.5 | 6.0 | 1,200.0 |

See Example 1 for footnotes.

Although all of the above examples show equal amounts of cork and fiber, it should be understood that the ratio may be changed at will without affecting the other constituents or the processing.

While I have shown and described particular embodiments of my invention, it will occur to those skilled in the art that variations, changes and modifications may be made without departing from my invention, and I, therefore, aim in the appended claims to cover all such changes and modifications as fall within the true spirit and scope of my invention.

I claim:

1. The process of simultaneously coating cork granules and fibers with a coating material in emulsion form, which method comprises: making an aqueous blend slurry of cork granules and fibers, some of the cork granules having a size greater than 200 mesh and less than 60 mesh, with the blend slurry having a concentration of not more than about 2 percent by weight of said cork granules and fibers; gently agitating said blend slurry in a mass turbulent movement whereby the fibers and cork granules are continuously dispersed in the slurry; preconditioning the cork granules and fibers to substantially equal receptivity of coating material by adding to the slurry during agitation of a water-soluble salt of a polyvalent metal, and then adding alkali to produce a pH suitable for coagulation of the particular coating material being used, but in an amount insufficient to precipitate all of the polyvalent metal; and, before introducing the coating material, continuing the gentle agitation for a period of at least about 15 minutes to render said cork granules and said fibers substantially equally receptive to the deposition of coating material thereon; and then slowly adding to the ebullient slurry the coating material in the form of an emulsion; whereby the fibers and granules are simultaneously coated substantially uniformly and equally.

2. The process as set forth in claim 1 in which the fibers consist of vegetable pulp.

3. The process as set forth in claim 1 in which the fibers consist of vegetable pulp and the coating material is an elastomeric latex.

4. The process as set forth in claim 1 in which the fibers consist of vegetable pulp, the coating material is a rubber latex, the amount of water-soluble salt added for the preconditioning step is sufficient to produce a pH of about 4 in the slurry, and the amount of alkali added in the subsequent step is sufficient to raise the pH of the slurry to about 5.

5. The process as set forth in claim 1 in which the coating material is in the form of an emulsion having a percentage of solids less than about 10 percent.

6. The process as set forth in claim 1 in which a dilute coagulant is added to the ebullient slurry after the addition of the coating material to exhaust the coating emulsion from the dispersion medium.

7. The process as set forth in claim 1 in which the blend slurry is agitated by means of a gas bubbling upwardly therethrough.

References Cited in the file of this patent

UNITED STATES PATENTS

| | | |
|---|---|---|
| 2,077,016 | Schacht | Apr. 13, 1937 |
| 2,666,699 | McQuiston | Jan. 19, 1954 |
| 2,676,099 | Kao | Apr. 20, 1954 |
| 2,720,476 | Baymiller | Oct. 11, 1955 |
| 2,843,479 | Piersol | July 15, 1958 |